United States Patent [19]

Ostrand

[11] Patent Number: 5,009,392
[45] Date of Patent: Apr. 23, 1991

[54] ROTARY AIR VALVE

[75] Inventor: James C. Ostrand, Armada, Mich.

[73] Assignee: General Motors Corporation, Detroit, Mich.

[21] Appl. No.: 521,874

[22] Filed: May 11, 1990

[51] Int. Cl.$^5$ .............................................. F16K 5/04
[52] U.S. Cl. ..................................... 251/180; 251/182
[58] Field of Search ............... 251/176, 177, 180, 181, 251/182, 185

[56] References Cited

U.S. PATENT DOCUMENTS

| | | | |
|---|---|---|---|
| 2,545,220 | 3/1951 | Wolcott, Jr. | 251/182 X |
| 3,395,889 | 8/1968 | Chovan | 251/182 X |
| 3,406,943 | 10/1968 | Newell | 251/182 X |
| 4,683,913 | 8/1987 | Hoffman et al. | 137/625.4 |

Primary Examiner—John C. Fox
Attorney, Agent, or Firm—R. L. Phillips

[57] ABSTRACT

A rotary air valve for a motor vehicle air conditioning, heating and ventilation system has a spring biased floating valve mounted on a rotary valve frame. The floating valve is spring biased radially outward against the interior of the case so that arcuate ribs at opposite ends thereof remain engaged in internal grooves in the case to provide sealing at these locations while the other oppositely arranged edges of the valve are contacted by seals that are mounted within the case on opposite sides of the openings controlled by the valve.

4 Claims, 1 Drawing Sheet

ROTARY AIR VALVE

TECHNICAL FIELD

This invention relates to rotary air valves and more particularly to the sealing thereof.

BACKGROUND OF THE INVENTION

In rotary air valves such as used in motor vehicle air conditioning, heating and ventilation systems, the periphery of the rotary air valve which may also be called a door is required to seal against the surrounding generally cylindrical case in a consistent manner Moreover, the movement of the valve between positions should be with a minimum of effort. However, the peripheral sealing surface of the valve normally has sliding contact as compared with the twoface contact of a flapper valve. This makes it difficult to control the contact pressure between the seal surfaces while minimizing the effort required to move the valve. Typically, seal materials are selected such as plastic foam, felt, wool pile, and rubber in combination with various retainers in an attempt to control the contact pressure between the seal surfaces. However, the complexity of such combination designs requires added space, is costly and still gives inconsistent sealing and frictional characteristics at various climatic conditions. For example, the different expansion characteristics between the valve, case and seals at temperature extremes causes inconsistent seal performance particularly at low temperatures where it is possible for the valve to freeze in position The functional problem of the rotary valve in turn causes high control lever efforts and potential overload of the valve's operating mechanism.

One solution to the above problems is disclosed in U.S. Pat. 4,683,913 and entails a certain geometrical relationship between the valve seal assembly and the case's sealing surfaces that establishes a predeterminable, consistently controlled contact pressure along the peripheral sealing arrangement. In this arrangement, instead of having the curved sealing surface on the valve case be concentric with the valve axis, it has a fixed radius of curvature whose axis is offset from that of the valve. As a result, there is an eccentric kind of relative motion such that the valve is rotatable to and from its closed position moving toward and away from but not along the seals with the sealing eventually being accomplished during the final stages of closure. And while this solution has proven generally satisfactory, the valve, case and seals require close tolerances to establish the desired sealing force completely along the length of the seal.

SUMMARY OF THE INVENTION

The present invention allows much larger tolerance stack up in the parts while maintaining consistent uniform sealing about the valve face. This is very simply accomplished with a valve (door) frame that is pivoted on the case. The valve frame carries a floating valve that is spring biased radially outward against the case. Elastomeric seals are mounted on the interior of the case along axially extending parallel edges of the case openings and the floating valve engages these seals and, in addition, has annular rib and groove engage with the interior of the case at the remaining arcuate edges of these openings to provide air tight sealing. And thus it will be appreciated that the amount of permissible tolerance stack up between the relatively movable parts is greatly expanded by the spring-loaded radial movement possible with the floating valve. Moreover, the frictional force exerted by the elastomeric seals on valve movement can nevertheless be closely controlled by the rib and groove contact between the valve and case which in itself is a relatively low sliding friction arrangement as compared to sliding along a compressed seal material Furthermore, it will be appreciated that the sealing force can be very accurately determined by the amount of spring rate provided in the spring arrangement which can be readily modified or altered.

It is therefore an object of the present invention to provide a new and improved rotary air valve.

Another object is to provide a rotary air valve arrangement having a floating valve that is spring-loaded for sealing contact about the valve face.

Another object is to provide a rotary air valve having a valve frame that is pivotably mounted in a case and a floating valve that is spring mounted on the valve frame for uniform sealing engagement thereabout within the case.

These and other objects, advantages and features of the present invention will become more apparent from the following description and drawing, in which:

DESCRIPTION OF THE PREFERRED EMBODIMENT

Figure 1:
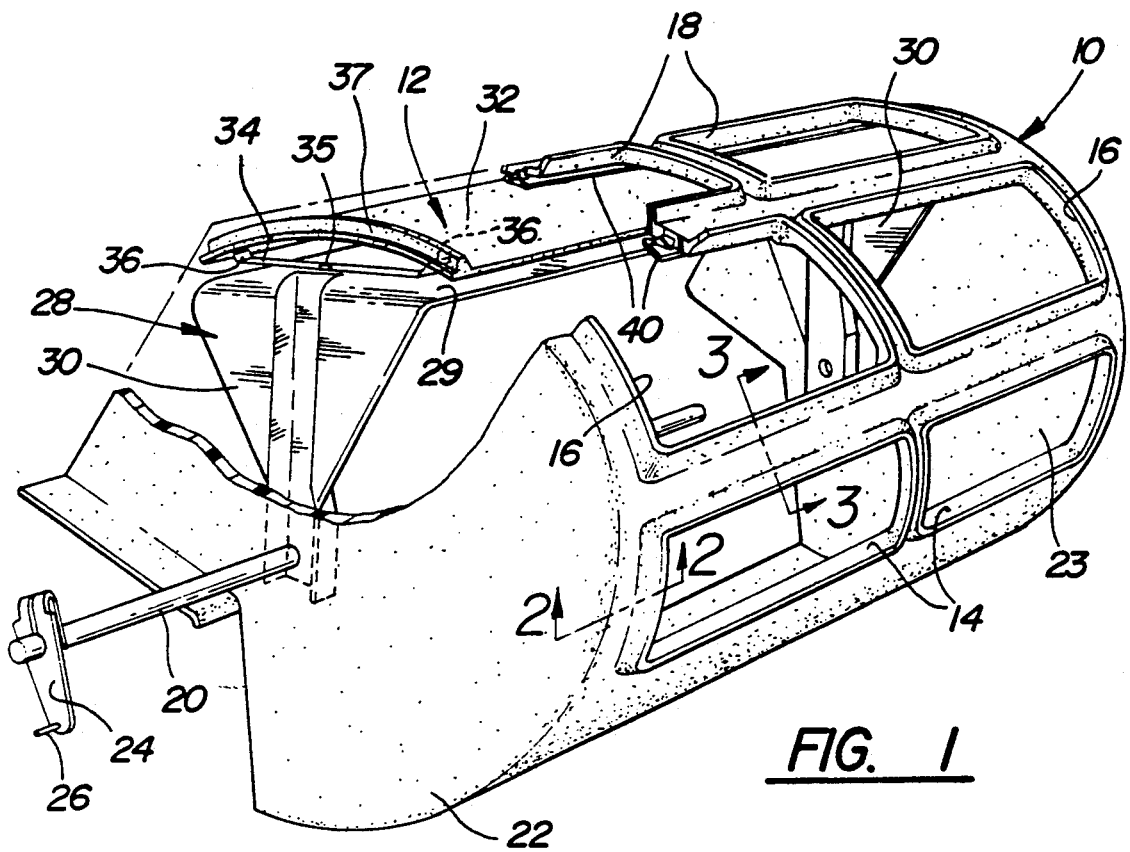
FIG. 1 is a three dimensional view with parts broken away of a rotary air valve constructed according to the present invention.

Referring to FIG. 1, there is shown a generally cylindrical plastic case or housing 10 forming a portion of a motor vehicle air conditioning, heating and ventilation system. A rotary air valve assembly 12 mounted in the case provides mode selection in the system by controlling the opening and closing of a pair of heater outlet openings 14, a pair of air conditioning outlet openings 16, and a pair of defroster outlet openings 18, all formed in the case.

The rotary air valve assembly is mounted in the case on a shaft 20 whose opposites ends are journaled in opposite sides 22 and 23 of the case. One end of the shaft is connected to a lever 24 that in turn is connected by a sheathed wire 26 to a hand lever (not shown) that is manually controlled in the vehicle's passenger compartment to select the desired mode; namely, heating, air conditioning or defrosting.

Describing now the valve assembly details, a sheet metal valve frame 28 has a flat platform section 29 and a pair of identical arms 30 that extend radially inward from the ends of the platform section and are fixed to the shaft 20 near the opposite sides of the case. A floating plastic valve 32 has an arcuate shape conforming to the cylindrical configuration of the case and is mounted on the valve frame by a pair of leaf springs 34 (only one being shown). The springs 34 are secured at a center point thereof to the valve frame at opposite ends of the latter by means of a rivet 35 and are fixed to the valve by having their ends received in pockets 36 formed in the underside of the valve.

Figure 2:
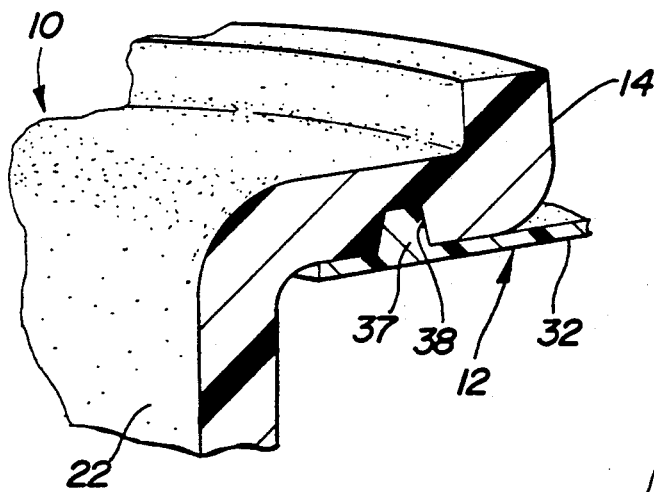
FIG. 2 is an enlarged sectional view taken along line 2—2 in FIG. 1 with the valve moved thereto.
Figure 3:
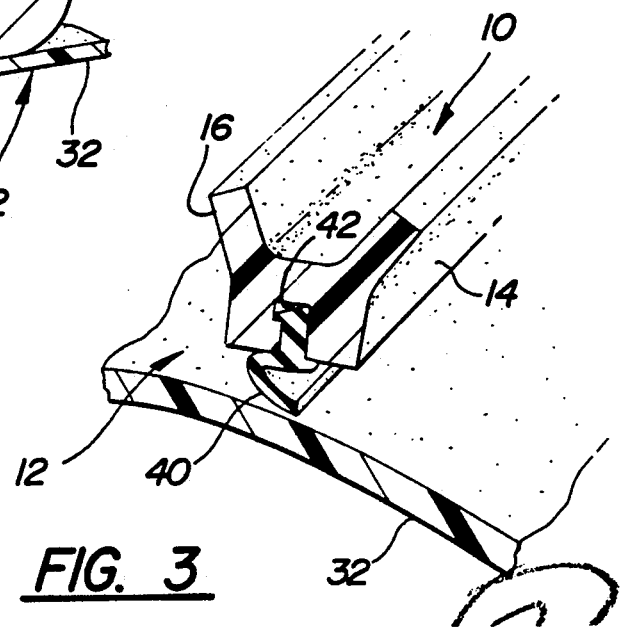
FIG. 3 is an enlarged sectional view taken along line 3—3 in FIG. 1 with the valve moved thereto.

As best seen in FIG. 2, the floating valve has an arcuate rib 37 at each end thereof that is received in an internal groove 38 in the case to provide sealing in the annular direction at these end locations of the valve. On the other hand, an elastomeric seal 40 is snap fit in an undercut groove 42 formed in the case along each side of the case openings, i.e., along their edges which extend parallel to the axis of the valve and case.

The springs 34 bias the valve 32 radially outwardly such that the ribs 37 are maintained in engagement with the grooves 38 in the case while the elastomeric seals 40 yieldingly contact the valve intermediate the ribs to thereby complete the sealing contact about the periphery of the valve when the valve is covering one of the pairs of openings, e.g., the defrost openings 18 as seen in FIG. 1. To this end, the grooves 38 in the case span the annular length of the openings so that the valve is in continuous sealing contact with the case outboard of the openings as the valve is moved between the various mode positions while the respective elastomeric seals 40 are in a position to complete the sealing of the respective openings when the valve is moved in position to cover or close the respective openings.

Moreover, it will be appreciated that a wide range of tolerances can be accommodated in the parts as determined by the amount of relative radial movement permitted between the valve and its frame and the case. Furthermore, it will be appreciated that the sealing force can be readily altered by simply changing the spring force, the durometer of the elastomeric seals and/or the configuration of the latter as they in themselves have a radial compliance beyond their elasticity by virtue of, for example, a hooked shaped section as shown. Furthermore, it will be appreciated that as an alternative to the snap in seals, there may be provided a sheet of foam that is mounted on the interior of the case and has cutouts that align with the respective openings.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A rotary air valve for a motor vehicle heating, air conditioning and ventilation system comprising a generally cylindrical case having an opening through which air may flow, rotary air valve means mounted in the case for rotatable movement about an axis so as to cover and uncover said opening, said rotary air valve means comprising a valve frame rotatable about said axis, floating valve means mounted on said valve frame, spring means for urging said floating valve means radially outward against said case, cooperating annularly extending rib and groove means on said floating valve means and said case for sealing said valve means with respect to said case at one of two pairs of opposite sides of said openings, and axially extending compliant seal means on said case for sealingly contacting said valve means at the other pair of said sides of said opening whereby said rib and groove means and said seal means cooperatively seal said valve means about the perimeter of said opening when said valve means is rotated to cover same.

2. A rotary air valve as defined in claim 2 wherein said spring means comprises a pair of leaf springs mounted on said valve frame at opposite axial ends of said floating valve means.

3. A rotary air valve for a motor vehicle heating, air conditioning and ventilation system comprising a generally cylindrical case having an opening through which air may flow, rotary air valve means mounted in the case for rotatable movement about an axis so as to cover and uncover said opening, said rotary air valve means comprising a valve frame rotatable about said axis, floating valve means mounted on said valve frame, spring means for urging said floating valve means radially outward against said case, an annularly extending rib on said floating valve means received in a corresponding groove on said case for sealing said valve means with respect to said case at one of two pairs of opposite sides of said openings, and axially extending complaint seal means on said case for sealingly contacting said valve means at the other pair of opposite sides of said opening whereby said rib and groove means and said seal means cooperatively seal said valve means about the perimeter of said opening when said valve means is rotated to cover same.

4. A rotary air valve as defined in claim 3 wherein said spring means comprises a pair of leaf springs mounted on said valve frame at opposite axial ends of said floating valve means.

* * * * *